W. C. BRAUN.
HORSE DRAG.
APPLICATION FILED SEPT. 21, 1909.

957,185.

Patented May 10, 1910.

2 SHEETS—SHEET 1.

Witnesses
W. G. Jones
E. Hirst

Inventor
William C. Braun
By Woodward & Chandlee
Attorney

W. C. BRAUN.
HORSE DRAG.
APPLICATION FILED SEPT. 21, 1909.
957,185.
Patented May 10, 1910.
2 SHEETS—SHEET 2.
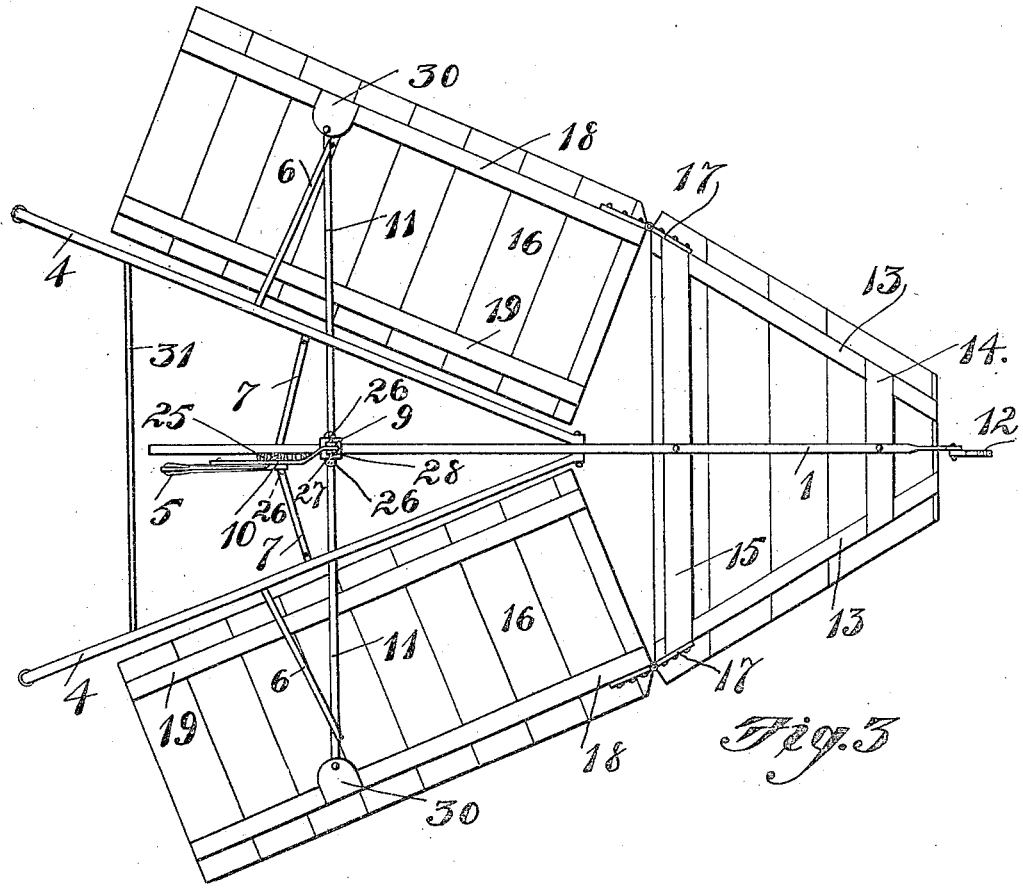
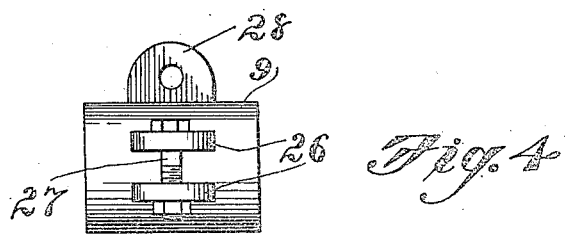
Witnesses
M. G. Jones
E. Hurst
Inventor
William C. Braun
By Woodward & Chandlee
Attorneys

UNITED STATES PATENT OFFICE.

WILLIAM C. BRAUN, OF MARYSVILLE, INDIANA.

HORSE-DRAG.

957,185. Specification of Letters Patent. Patented May 10, 1910.

Application filed September 21, 1909. Serial No. 518,787.

*To all whom it may concern:*

Be it known that I, WILLIAM C. BRAUN, a citizen of the United States, residing at Marysville, in the county of Clark and State of Indiana, have invented certain new and useful Improvements in Horse-Drags, of which the following is a specification.

This invention has relation to certain new and useful improvements in drags.

The object of my invention is to provide a lever operated drag, so contrived that the trail or spread of the drag may be regulated.

With the above and other objects in view, the present invention consists in the combination and arrangement of parts as will be hereinafter more fully described and particularly pointed out in the appended claim, it being understood that changes in the specific structure shown and described may be made within the scope of the claim without departing from the spirit of the invention.

Figure 1:
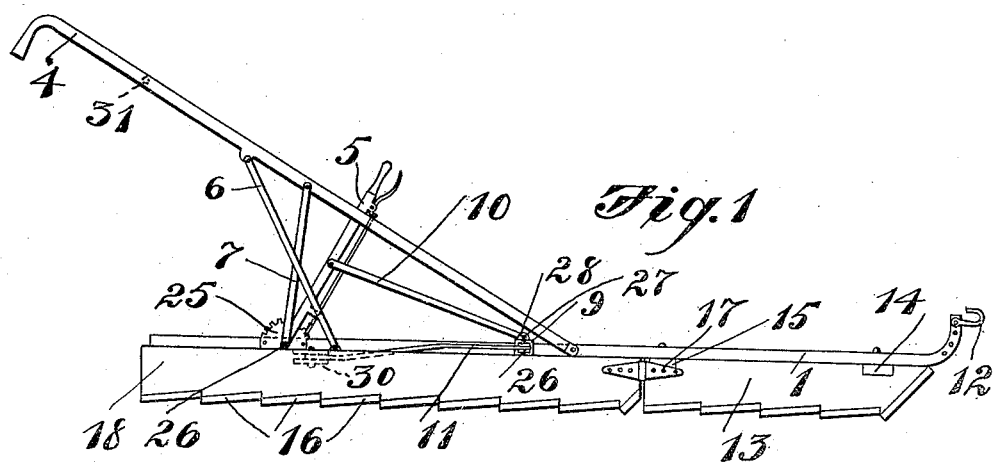
Figure 2:
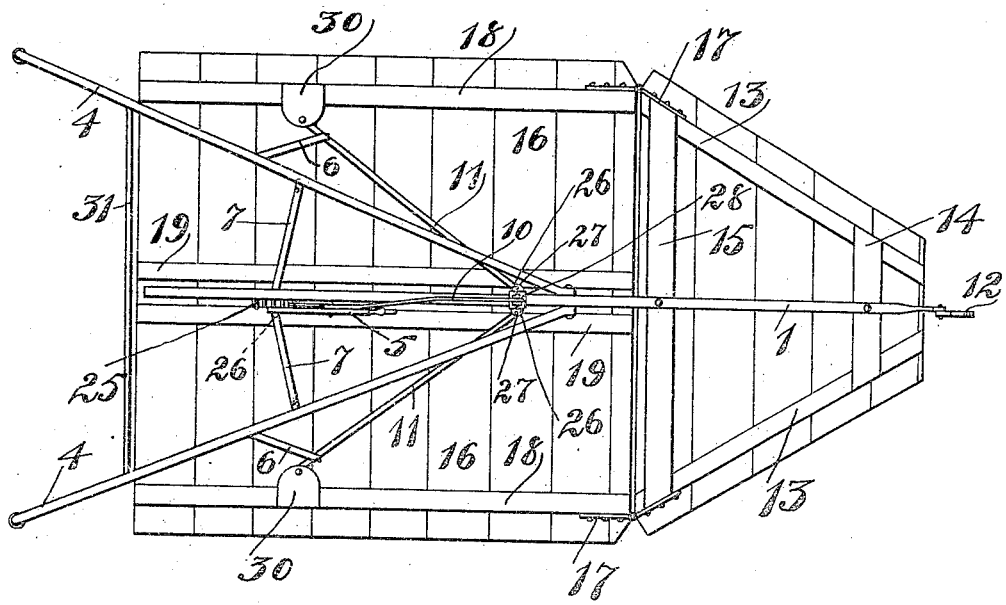

In the drawings forming a part of this specification, and in which like numerals of reference indicate similar parts in the several views, Figure 1 shows a side elevation of a drag embodying my invention. Fig. 2 is a top view of a drag disclosing the two wings in their closed position. Fig. 3 discloses a top view showing the wings in their distended position. Fig. 4 is an enlarged detatched detail disclosing the method of securing the guiding handles to the operating bars.

This invention relates to that class of implements employed to level the surface of a plowed field, and comprises a one horse operated drag, though the same may be enlarged and used in connection with a number of draft animals.

In the accompanying drawings the numeral 13 designates the two similar side bars which are obliquely held and are connected by means of the cross bars 14 and 15, to form the frame or head section of the drag. The lower edges of these two bars 13 are serrated so that the drag boards secured to the lower edge of these side bars incline downwardly and rearwardly as clearly disclosed in Fig. 1. As shown in Figs. 2 and 3, this head section increases in width toward its rear end.

Secured to the side bars 13 and preferably along their outer faces, are the strap hinges 17 each hinge being secured to a side bar 18 forming one of the frame members of the adjustably held wings as used in my invention. Each wing includes two such bars marked 18 and 19, having their lower edges serrated and also provided with the drag boards 16 as shown in Fig. 1. As disclosed the width of the two wings is approximately that of the rear end of the head section, each wing being secured to the hinge near its forward outer edge, so that these wings may be swung outwardly and away from each other, as shown in Fig. 3, when it is desired to enlarge the active surface of the drag.

Extending rearwardly from the cross bars 14 and 15, to a point beyond the end of the wings, is the guide bar 1. This guide bar at its forward end carries the swingletree hook 12 to which the draft animal is secured. Near its rear end, this bar carries the rack segment 25 and the pivot pin 26 from which extends the operating lever 5 provided with a pawl arranged for co-action with the rack segment as is usual in the art.

Slidably held on the guide bar 1 is the collar 9 on which are the oppositely positioned ears 26 carrying the pins 27 while upwardly extending from this collar 9 is the ear 28 from which extends the connecting rod 10 fastened to the operating lever 5 as shown. By means of this lever the collar can be thrown backward and forward upon the guide bar 1.

Secured to the outer frame member 18 of each wing, is a securing ear 30 from which ears extend the two similar operating bars 11 held between the ears 26 and pivotally secured by means of the pin 27 to the collar 9. By moving the collar 9 backward and forward, the wings can be thrown outward or inward.

Extending upward from the main guide bar 1, are the the two similar guide handles 4 which are provided with the inner brace rods 7 secured to the guide bar 1, these handles being further strengthened by means of the cross bar 31. Pivotally secured to each handle 4 is an outwardly extending brace rod 6 each rod 6 having its lower end pivotally secured to one of the operating bars 11.

In operation, the device is dragged over the field. When it is desired to increase the active surface of the drag, the operator throws the lever 5 backward which results in the wings being swung outward so that the trail of the drag can be widened.

The device is simple and inexpensive in construction and both durable and efficient in operation.

Having thus described my said invention, what I claim as new and desire to secure by United States Letters Patent is:

In combination, a head section increasing in width toward its rear end, cross bars secured to said head section, a guide bar extending rearward from said cross bars, an operating lever pivoted to said guide bar, a rack segment secured to said guide bar, an operating pawl carried by said lever in engagement with said segment, two similar oblong drag wings pivotally held to said head, a securing ear carried by each drag wing, a collar slidably held upon said guide bar, a connecting rod extending from said collar to said lever, operating bars extending from said collar to each of said ears, two guiding handles secured to said guide bar, an inner brace rod extending from each handle to said guide bar, and a pivotally held outer brace rod extending from each of said operating bars to the adjacent guide handle.

In testimony whereof I affix my signature, in presence of two witnesses.

WILLIAM C. BRAUN.

Witnesses:
GEORGE H. LINDENMAYER,
ALFRED H. HUMPHRAY.